Feb. 16, 1971 C. E. WILLIAMS Re. 27,066

SAFETY STORAGE CABINET

Original Filed Jan. 18, 1967

INVENTOR
C.E. WILLIAMS

BY Irwin C. Alter
ATTORNEY

United States Patent Office

Re. 27,066
Reissued Feb. 16, 1971

27,066
SAFETY STORAGE CABINET

Clarence E. Williams, % A & A Sheet Metal Products, 644 N. Orleans, Chicago, Ill. 60610

Original No. 3,403,954, dated Oct. 1, 1968, Ser. No. 610,053, Jan. 18, 1967. Application for reissue July 24, 1969, Ser. No. 853,559
Int. Cl. A47b *96/00*
U.S. Cl. 312—351 6 Claims

Matter enclosed in heavy brackets [ ] appears in the original patent but forms no part of this reissue specification; matter printed in italics indicates the additions made by reissue.

ABSTRACT OF THE DISCLOSURE

Storage cabinet is for combustible materials and automatically closes after opening and when retained in open position it automatically closes when heated.

This invention relates to an improved storage cabinet for combustible materials and more particularly to an improved safety storage cabinet for combustible materials which has a new and improved safety door associated therewith.

Safety storage cabinets for storing combustible materials have been in existence for years, however, they have not served the purpose for which they are intended due to the fact that they depend on the operators thereof to close them after withdrawing or inserting articles. To be of any use in preventing explosion and/or combustion of materials therein the cabinet must be closed.

I have obviated this problem with prior safety storage cabinets by providing a door having a plurality of panels in combination with the opening of a safety storage cabinet. The door is spring biased so that the opening of the storage cabinet is immediately covered after the door has been opened. Also, where it is desired to retain the door in its open position, I have provided a heat fusible link in combination with the panels of the door to retain said panels in their open position. The heat fusible link releases the panels so that they are actuated to their closed position upon the application of heat which results upon the occurrence of a fire which can be dangerous to the combustible material to be stored in the cabinet.

It is therefore a primary object of this invention to provide a new and improved safety storage cabinet which causes the door thereof to cover the opening of the storage cabinet either automatically when opened or automatically upon the occurrence of a fire which could possibly cause combustion of the materials in the storage cabinet.

Still another problem with storage cabinets is providing a door which does not require a sweep that is equal to the width of the storage cabinet's opening which is covered by the door. In the past, storage cabinets have been cumbersome and impractical due to the necessity of locating them in places where the doors thereof can be opened without interference. I have solved this problem by providing a door which has a plurality of panels that are substantially superimposed upon each other when the door is in its open position.

It is, therefore, another object of my invention to provide a safety storage cabinet that is not limited to placement in a location where its open position would require clearence for the sweep of a door which is equal in width to the width of the opening covered thereby.

Yet, another object of the invention is to provide safety storage cabinets having a door capable of being retained in an open position. The door and the cabinet are provided with means for speedy closure if a fire occurs in the vicinity of the cabinet.

More particularly, the doors slide closed rather than rotating to a closed position. In addition, air vents are provided in the cabinet to prevent trapped air from slowing the closing of the doors.

It is even still another object of this invention to provide a safety storage cabinet that can be placed in a greater variety of locations than prior storage cabinets.

Other and further objects of this invention will become more readily apparent from reading this description in conjunction with the drawing wherein.

Figure 2:
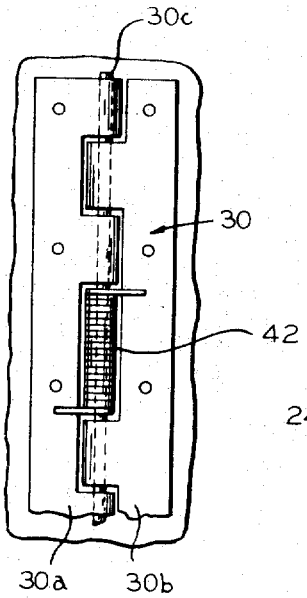
FIG. 2 is an enlarged fragmentary view of the embodiment of one of the hinge structures of the door associated with my device.
Figure 1:
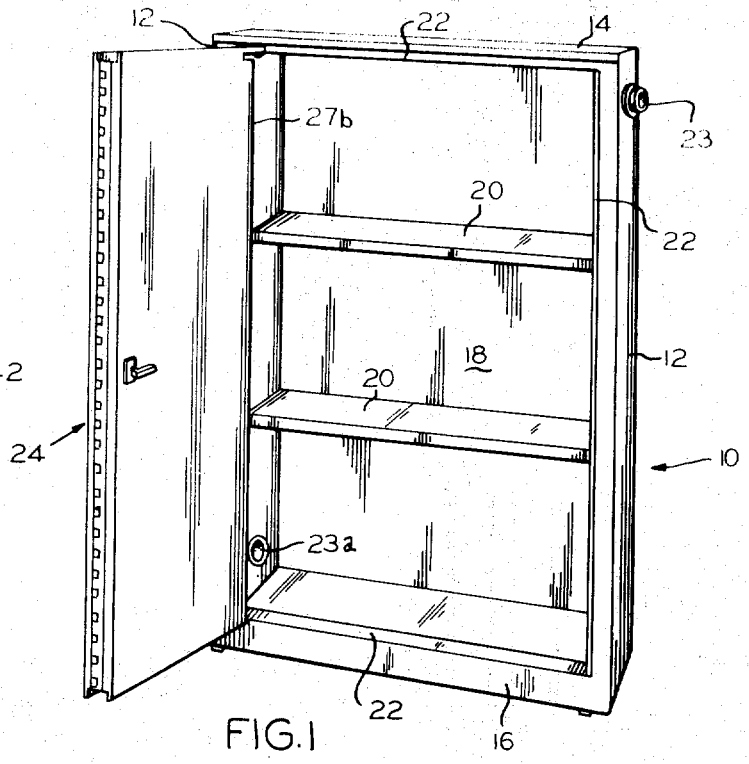
FIG. 1 is a pictorial view of a safety storage cabinet incorporating my invention.
Figure 3:
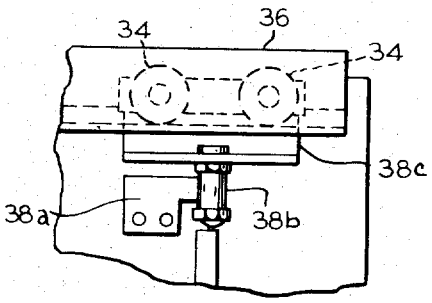
FIG. 3 is a fragmentary elevational view illustrating how the door of my device is associated with my storage cabinet by means of a roller.

Referring to the drawing wherein like characters of reference indicate corresponding parts throughout, the safety storage cabinet 10 of my invention is illustrated in FIG. 1. It comprises among other things an upright structure defining an enclosure by means of metallic members such as the vertical walls 12, top and bottom walls 14, 16 respectively and rear wall 18. Top and bottom vents 23, 23a are respectively formed in the vertical walls in order to prevent explosions by continuously expelling gas therefrom. The top and bottom vents also prevent the entrapment of air while the doors are closing. This escape route for the air enables the doors to close with maximum speed. Shelves 20 are associated with the metallic walls and can be horizontally positioned therein as illustrated in FIG. 1.

Figure 4:
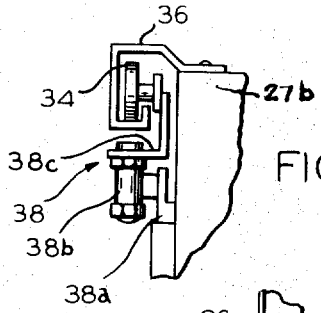
FIG. 4 is an end view of FIG. 3.

The storage cabinet 10 has an access opening 22 which is defined by the metallic members 16, 12, 14 whereby combustible materials can be taken from or placed therein. A door 24 having a plurality of panels such as first panel 26 and second panel 27 is associated with the storage cabinet to cover said access opening 22. The first panel 26 has one of its sides 26a pivotally mounted to one of the walls 12 by means of the hinge 32. The other side 26b of the first panel 26 is pivotally associated with one of the sides 27a of the second panel 27 by means of the hinge 30. The second panel has a roller 34 associated therewith on the top of the door at its other side 27b. The roller 34 is in turn associated with the top 14 of the storage cabinet by a horizontal track 36 that is attached to the top of the storage cabinet as illustrated in FIG. 4. The roller 24 can be associated with the top of the door by means of any type of bracket arrangement such as the bracket arrangement 38 which includes a member 38a attached to and extending upward from the panel that is in turn associated with a locking nut 38b and an L-shaped bracket 38c to journal the roller 34.

Figure 5:
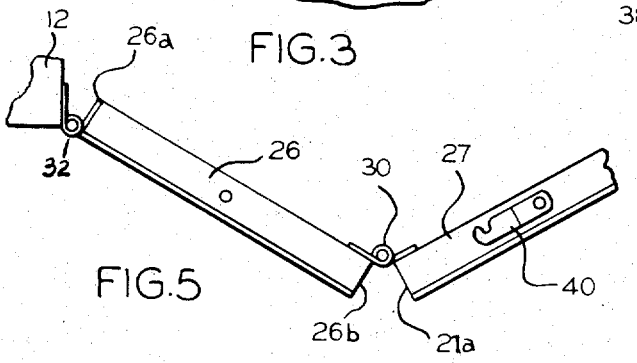
FIG. 5 is a top view of the door of my device illustrating a fusible link associated therewith when the panels of the door are in their expanded position.
Figure 6:
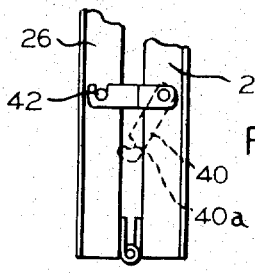
FIG. 6 is a view similar to FIG. 5 wherein the door of my device has its panels folded to their closed position with the fusible link thereof retaining the door in that position.
Figure 7:
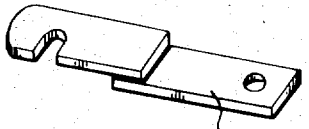
FIG. 7 is an enlarged pictorial view of the fusible link of my device.

As will be seen from FIGS. 5 and 6 when the door is folded or in its open position it has its panels in a superimposed position. The door is retained in this position by the fusible link 40. The fusible link 40 can be formed with an opening 40a and pivotally mounted on one of the panels to engage a peg member 42 attached to and extending from the top of the other panel, as illustrated in FIG. 6.

From FIG. 12 it is seen that the hinge 30 has interlocking hinge leafs 30a and 30b pivotally associated with each other by means of a hinge pin 30c. The hinge 30 also has coil spring members 42 that are retained in position by the hinge pin 30c and exert a biasing force on the door in order that the door is continually urged to its closed position where the panels are unfolded and are located across the access opening 22 to cover the same. Thus, the door is always urged to its closed position unless a force in excess of said biasing force retains the door in its open position. The door can be retained in an open position by either applying manual force thereto or by placing the link in locked position as illustrated in FIG. 6. When, however, the link is placed in its locked position heat melts the link to thereby release the door so that it can move to its closed position by means of the coil spring.

To summarize the operation of my safety cabinet storage device, the door thereof can be opened for access thereto for the purpose of removing or storing articles. Thereafter, the door can be retained in its open position by means of the fusible link, being rotated to its locked position with the peg or it will be urged to its closed position by the spring biasing means associated therewith. When the door is in its open position the panels thereof are substantially superimposed and therefore do not require as great of a clearance as a door which requires a sweep equal to the complete width of the access opening. If a fire occurs while the door is retained in its open position, it will cause melting of the fusible link and thereafter the door will be caused to close.

Having thus described my invention and its operation it is seen that my storage cabinet fulfills the objects of this invention remarkedly. Not only is the storage cabinet easily located in a greater variety of places due to its improved door but also the storage cabinet is safer because of its tendency to be closed and the ability of the doors to close without entrapping air in the cabinet.

While the principles of the invention have been described above in connection with specific apparatus and applications, it is to be understood that this description is made only by way of example and not as a limitation on the scope of the invention.

I claim:

1. A safety cabinet for storing combustible material, said cabinet comprising:

an upright enclosure defined by metallic walls and top and bottom portions, said metallic walls and top and bottom portions defining an access opening whereby materials can be placed in or removed from said storage cabinet through said access opening, a door associated with said access opening to cover said access opening, said door comprising a plurality of panels including a first and a second panel, said first panel having one of its sides hingedly mounted to one of said walls defining the access opening, said first panel having its other side associated by hinged means to one of the sides of said second panel, said second panel having a portion of its other side slidingly associated with the top of said cabinet whereby said other side of said second panel is constrained to move across said opening, said door having an open and a closed position, said door being fully extended to cover the said access opening in its closed position, said door having its panels in a substantially superimposed position when said door is in its open position, said door being spring biased to its closed position, whereby said door is always in its closed position unless restrained by a force at least equal to said biasing force,

[a heated fusible link, and means for using said link to directly connect said first panel to said second panel when said door is in open position to maintain said door in said open position, whereby if said link is melted by heat from a fire the said door will immediately move to its closed position to protect combustible material disposed in said storage cabinet.] *a heat fusible link means associated with said door when said door is in open position to maintain said door in said open position,*

*said link means being directly responsive to heat and melting upon application of heat,*

*said door moving to its closed position to protect combustible material disposed in said storage cabinet in direct response to melting of said fusible link means.*

2. A safety storage cabinet, as defined in claim 1, wherein said heat fusible link is pivotally mounted on the top of one of said panels, said link being formed with an opening on one side thereof, a peg member suitably sized to fit in the opening of said fusible link, said peg member being mounted on the top of said other panel and disposed to form an interlocking relationship with said fusible link when it is desired to retain said door in its open position, whereby said link can be rotated to either retain said door in its open position or release said door in order that it can move to its closed position.

3. A safety storage cabinet, as defined in claim 1, wherein said second panel is associated with said cabinet by means of a roller, and a horizontal track extends across said opening of said cabinet to receive said roller when sad door is in its open or closed position.

4. A safety storage cabinet, as defined in claim 3, wherein said horizontal track is disposed on the top of said opening and shelves are provided inside said enclosure of the storage cabinet.

5. A safety storage cabinet as defined in claim 4, wherein vent openings are provided in each of the side walls thereof at both the top and bottom of said cabinet.

6. A safety storage cabinet device, as defined in claim 4, wherein said spring biased means are coil springs associated with said hinge means attaching said first panel to said second panel.

References Cited

The following references, cited by the Examiner, are of record in the patented file of this patent or the original patent.

UNITED STATES PATENTS

| | | | |
|---|---|---|---|
| 427,899 | 5/1890 | Patterson | 49—7 |
| 2,043,198 | 6/1936 | Heverly | 16—48.5 |
| 2,703,140 | 3/1955 | Bonawit | 160—206 |
| 3,277,951 | 10/1966 | Levicke | 160—199X |
| 3,287,759 | 11/1966 | Foltz | 160—199X |
| 3,335,784 | 8/1967 | Risk et al. | 160—206X |

FOREIGN PATENTS

| | | | |
|---|---|---|---|
| 824,133 | 11/1959 | Great Britain | 49—7 |

JAMES T. McCALL, Primary Examiner

U.S. Cl. X.R.

16—48.5; 49—7; 160—199; 312—139